Feb. 6, 1962   G. FEFER   3,020,448
ELECTRIC DISINTEGRATION OF CONDUCTIVE MATERIALS
Filed Dec. 7, 1959

INVENTOR
GREGORY FEFER
BY
Shoemaker + Mattare
ATTORNEYS

United States Patent Office 3,020,448
Patented Feb. 6, 1962

3,020,448
ELECTRIC DISINTEGRATION OF CONDUCTIVE MATERIALS
Gregory Fefer, Newnham-on-Severn, Gloucester, England, assignor to Sparcatron Limited, Stafford, England, a company of Great Britain
Filed Dec. 7, 1959, Ser. No. 857,920
2 Claims. (Cl. 315—138)

This invention relates to the electric disintegration of conductive materials e.g., apparatus for working, cutting or grinding electrically conductive materials more especially hard metals such as metal carbides, and tool steels and stainless steels by means of time-spaced electrical discharges.

The principal object of the present invention is to provide improved arrangements for producing repeated electrical discharges across the gap between workpiece and electrode.

According to the invention apparatus for working electrically conductive materials by repeated time-spaced electric discharges across a gap between a workpiece and an electrode, includes at least one gate-controlled rectifying semi-conductor element supplied with alternating current.

Figure 1:
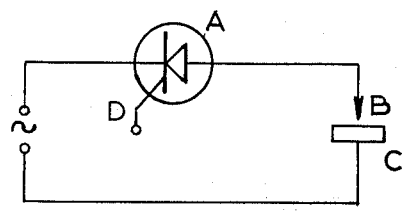

The invention will be further described with reference to the accompanying drawings in which FIGURE 1 shows one circuit arrangement, FIGURE 2 indicating how a gate electrode of a silicon-controlled rectifier is fed with pulses in synchronism with the alternating voltage supply.

Figure 3:
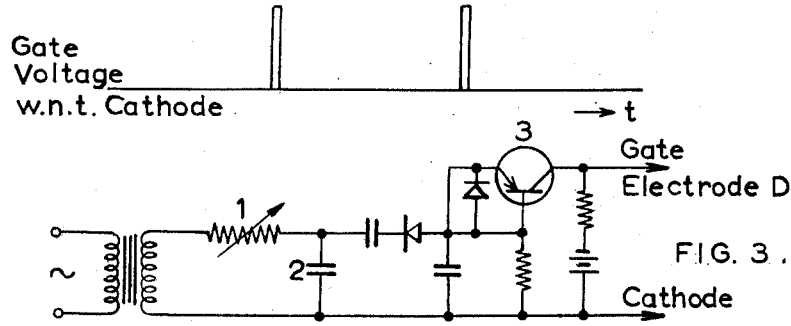
Figure 4:
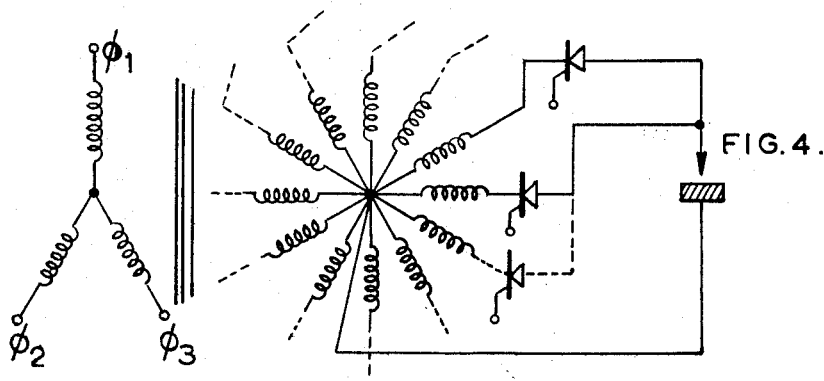

FIGURE 3 represents a typical circuit for feeding pulses to the gate electrode, while FIGURE 4 represents the circuit of another embodiment.

Referring now to the drawings, FIGURE 1 shows one circuit arrangement employing a silicon-controlled rectifier A in series with an A.C. supply and an electrode B and workpiece C.

Figure 2:
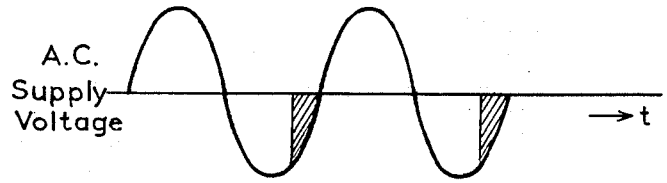

The gate electrode D is fed with low-power pulses arranged to be in synchronism with the alternating voltage supply so that the controlled rectifier will commence conduction at a point during the negative excursion of the supply voltage as shown in FIGURE 2. Conduction will cease when the alternating voltage again becomes zero so that a succession of time-spaced pulses of voltage having a repetition frequency equal to the frequency of the alternating voltage are applied to the spark gap B—C. Provision is made for the gate pulses to have a variable time-phase relation to the alternating supply voltage so that the voltage pulses applied to the spark-gap may be controlled in length, thus varying the relation between pulse length and deionisation period in the spark gap which is an important factor in spark-machining.

The method of feeding pulses to the gate electrode can be by any of several conventional circuit arrangements. A typical circuit is shown in FIGURE 3 where the A.C. supply voltage is shifted in phase by the variable resistor 1 and capacitor 2. A transistor 3 is used to produce a positive-going pulse of short duration which is applied to the gate electrode D of FIGURE 1.

The circuit of FIGURE 1 may be modified by the use of a multi-phase supply as shown in FIGURE 4 which represents one preferred embodiment of this invention. Here a twelve-phase supply is derived from a three-phase alternating voltage supply by means of a transformer wound to give interphase voltages as is well-known in the design of twelve-phase rectifier installations.

Each phase is fed to the spark-gap via a gate-controlled rectifying semi-conductor element such as a silicon controlled rectifier which is fed with gate pulses from a circuit of the type shown in FIGURE 3, which is, in turn, supplied from the alternating voltage of the same phase. The advantage of this arrangement is that the repetition frequency of the spark-gap voltage pulses is twelve times the frequency of the alternating supply voltage which enables material to be eroded at a high rate and produces a good surface finish on the workpiece.

What I claim is:

1. Apparatus for working electrically conductive materials by repeated time-spaced electric discharges across a gap between a workpiece and an electrode, including a gate-controlled rectifying semi-conductor element supplied with alternating current, wherein the gate electrode is fed with pulses arranged to be in synchronism with the alternating voltage so that the controlled rectifier will commence conduction at a point during the excursion of the supply voltage.

2. Apparatus for working electrically conductive materials according to claim 1 including a phase multiplying transformer and a gate-controlled rectifier in the supply of each phase to the discharge circuit.

References Cited in the file of this patent
UNITED STATES PATENTS
2,501,954    McKechnie et al. _____ Mar. 28, 1950

FOREIGN PATENTS
1,096,633    France _____ Feb. 2, 1955
407,022    Great Britain _____ Feb. 26, 1934